PHASING SYSTEM

Filed Nov. 26, 1956 2 Sheets-Sheet 1

INVENTORS
S. G. ALLEN, II
F. L. CURRIE
J. J. McMANUS
BY
ATTORNEY

Feb. 17, 1959 S. G. ALLEN II, ET AL 2,874,218

PHASING SYSTEM

Filed Nov. 26, 1956 2 Sheets-Sheet 2

INVENTORS
S. G. ALLEN, II
F. L. CURRIE
J. J. McMANUS

BY

ATTORNEY

United States Patent Office 2,874,218

Patented Feb. 17, 1959

2,874,218

PHASING SYSTEM

Samuel Gordon Allen II, Greenwich, Conn., Frank L. Currie, Plainfield, N. J., and John J. McManus, Valley Stream, N. Y., assignors to The Western Union Telegraph Company, New York, N. Y., a corporation of New York Application November 26, 1956, Serial No. 624,296

8 Claims. (Cl. 178—69.5)

Figure 1:
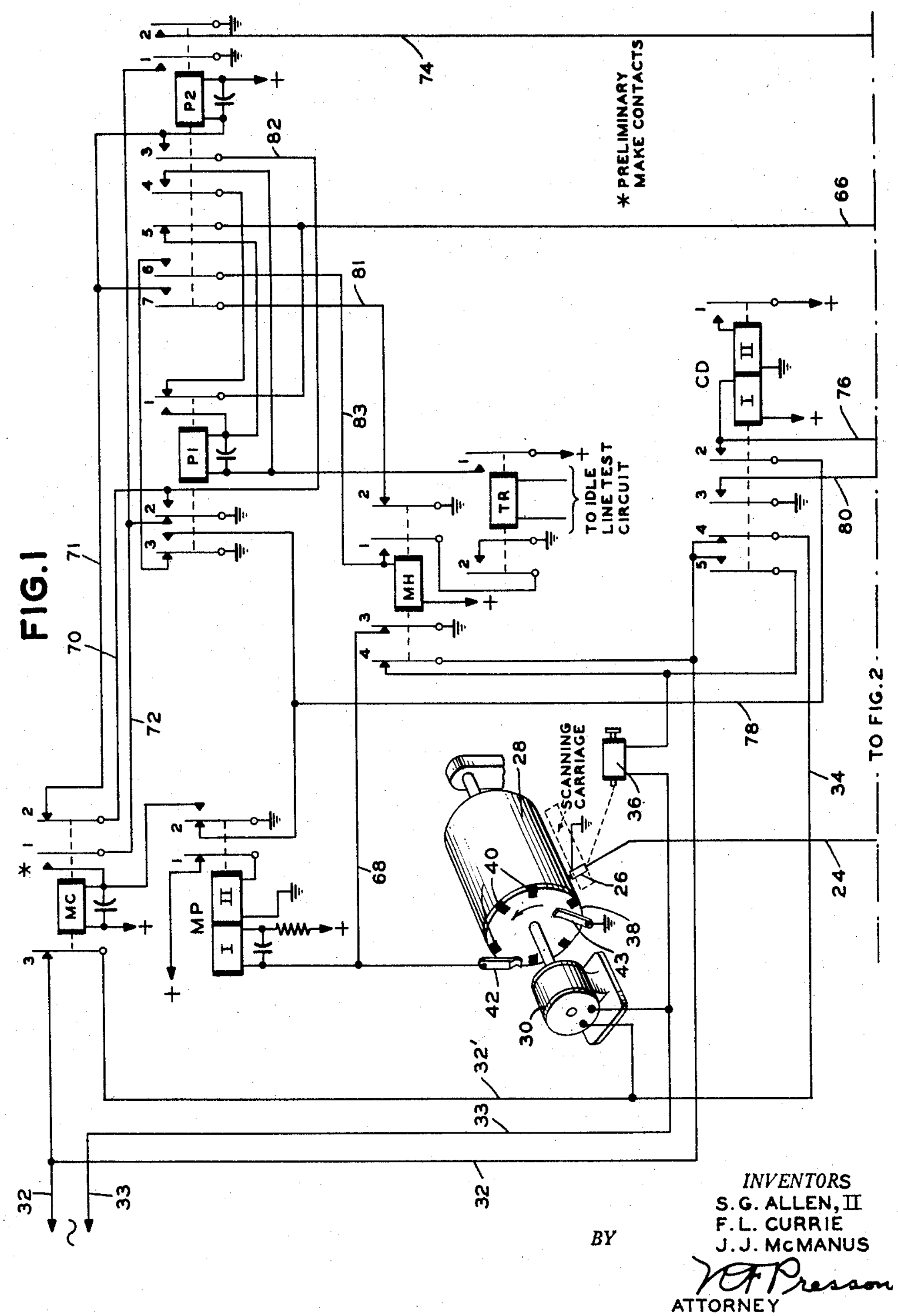

This invention relates to an improved phasing system for establishing the proper phase relation between two motor driven devices by means of phasing pulses produced at the devices and a phasing circuit responsive to these pulses for opening or otherwise affecting the motor driving circuit at one of the devices until it is in proper phase with the other device.

Although not limited thereto, the present invention is particularly applicable to a facsimile communication system in which a message incoming from a facsimile transmitter at a tie line patron's office or a branch office is received on a signal storage device, such as a magnetic recording and retransmitting drum, at a central switching office and then is retransmitted to a facsimile recorder usually at another patron's office or branch office. The central office equipment provides for switching incoming messages to the proper outgoing lines, and storage devices such as magnetic recorders are provided for recording an incoming message when the desired outgoing line is not available. Usually facsimile concentrator systems at the central office are provided for working between that office and a multiplicity of tie line patrons and branch offices; such concentrator systems may be manually operated by means of plug and jack connections such as shown in U. S. Patent 2,606,963 to Ridings et al., or may be of the automatic types such as shown in Ridings et al. U. S. Patents 2,616,963 and 2,689,273.

In the illustrative embodiment of the invention disclosed herein a magnetic drum is employed at a switching station as a facsimile repeater, i. e., for receiving and storing an incoming facsimile message from one office and then retransmitting the message to a desired receiving office; preferably, although not necessarily, facsimile transceivers are employed at the outlying offices. Various types of such transceivers are well known in the art such as, for example, disclosed in the U. S. patents to Wise et al. 2,718,547 and Ridings 2,742,526. The magnetic drum may comprise any of several known types, but preferably a drum bearing a covering storage surface comprised of magnetic material embedded in rubber is employed. It will be appreciated that the magnetic storage drum is first required to be brought into phase with a distant transmitting facsimile machine, and after recording is completed and a connection made to the desired distant receiving machine, the drum must be brought into exact phase with the receiving machine. Phasing with the transmitting machine, that is, for the incoming message, may be accomplished in various known ways, for example, by a clutch mechanism incorporated into the recording storage drum mechanism in a manner analogous to that commonly employed in multistylus concentrator facsimile recorders, or may be accomplished by a phasing circuit in a manner which eliminates the phasing clutch, such as disclosed in U. S. patent to Ridings et al. 2,689,273. Preferably, however, phasing for inbound messages is also accomplished by the phasing method embodied in the instant invention which is particularly applicable to phasing for outbound messages. Phasing pulses are transmitted from the transceiver machines at the transmitting and the recording offices toward the concentrator equipment in the central station, and hence the final operation of the phasing process is accomplished at the central station by effecting coincidence between locally generated phasing pulses and the phasing pulses received from an outlying office, and the storage recorder unit must be adapted to function in the same manner.

It has been found that the phasing methods heretofore employed are not satisfactory for phasing the magnetic storage drum with the receiving facsimile recorder. With reference to a clutch mechanism for phasing, a requirement which must be met on phasing with the receiving recorder is that the drum should not be unclutched from its driving motor inasmuch as due to imperfections in the driving gears, a disturbance pattern or jitter would be introduced into the recorder copy if the drum recording and retransmitting processes respectively were conducted with different gear orientations. In the type of phasing system employed heretofore in which the energizing circuit of the drum motor at the concentrator is opened, such a system causes the motor to be slowed by equal periods during each revolution until phase coincidence is achieved. When a large initial phase error exists, the periodic opening and closing of the drum motor energizing circuit eventually may bring the home and distant phasing pulses into coincidence, but since the interrupter cycles are uniform and unrelated to the phase error existing between the central and recording stations, the time required for phasing often becomes excessive. Such a method may require as many as twelve revolutions of the drum to effect phasing, and when applied to the driving motor for the storage recorder has been found to give erratic performance as well; it has been observed, by means of a dual beam oscilloscope, that frequently the home and distant pulses at the time of near coincidence actually do not come together and one pulse skips over the other, resulting in failure to phase.

In accordance with the instant invention, phasing is rapid and positive, and is effected by the operation of relays which open the motor driving circuit of the magnetic storage drum for a period proportional to the phase disparity, or phase difference, between the storage drum and receiving facsimile machine, and preferably phasing between a transmitting facsimile machine and the storage drum is effected in the same manner. The effect is to speed up the phasing operation so that phasing is accomplished within two or three revolutions of the magnetic drum. The instant system also insures a more exact phase coincidence by maintaining a motor control (phasing) relay energized in response to a home phasing pulse until the termination of the phasing pulse received from the distant station. Hence at the point of approaching pulse coincidence, the motor control relay is maintained energized for a period not less than the width of the second pulse, insuring positive action by the relay and thereby slowing the drum motor sufficiently to bring the pulses into coincidence. In the instant disclosure the circumference of the storage drum is six times that of the receiving facsimile drum, and the storage drum is arranged to lock in phase at any of the one-sixth points of the drum during a revolution thereof.

An object of the invention is to produce phasing between two motor driven units in a more efficient and effective manner.

Another object is to produce a system for phasing two machines, in which the motor driving circuit of one machine is opened or otherwise disabled for successive periods of different time intervals respectively proportional to the phase disparity then present between the two machines and thereby substantially reduce the time required for effecting phasing.

Still another object is to insure more exact phasing coincidence by causing the driving motor of one machine to be energized for a period not less than that represented by the time interval, commonly referred to as the width, of an incoming phasing pulse from the other machine in a manner to insure positive action for slowing the drifting motor of the one machine sufficiently at such time to bring the phasing pulses into coincidence.

A further object is to provide means for obviating the possibility of erroneous phasing indication during the period that the driving motor of one machine is coming up to speed from a standstill, by preventing phasing pulses incoming from the second machine from affecting the speed of the motor until after it has attained synchronous speed.

The foregoing and other objects of the invention will be apparent from the following detailed description of an illustrative embodiment thereof, taken in connection with the accompanying drawings in which—

Figure 2:
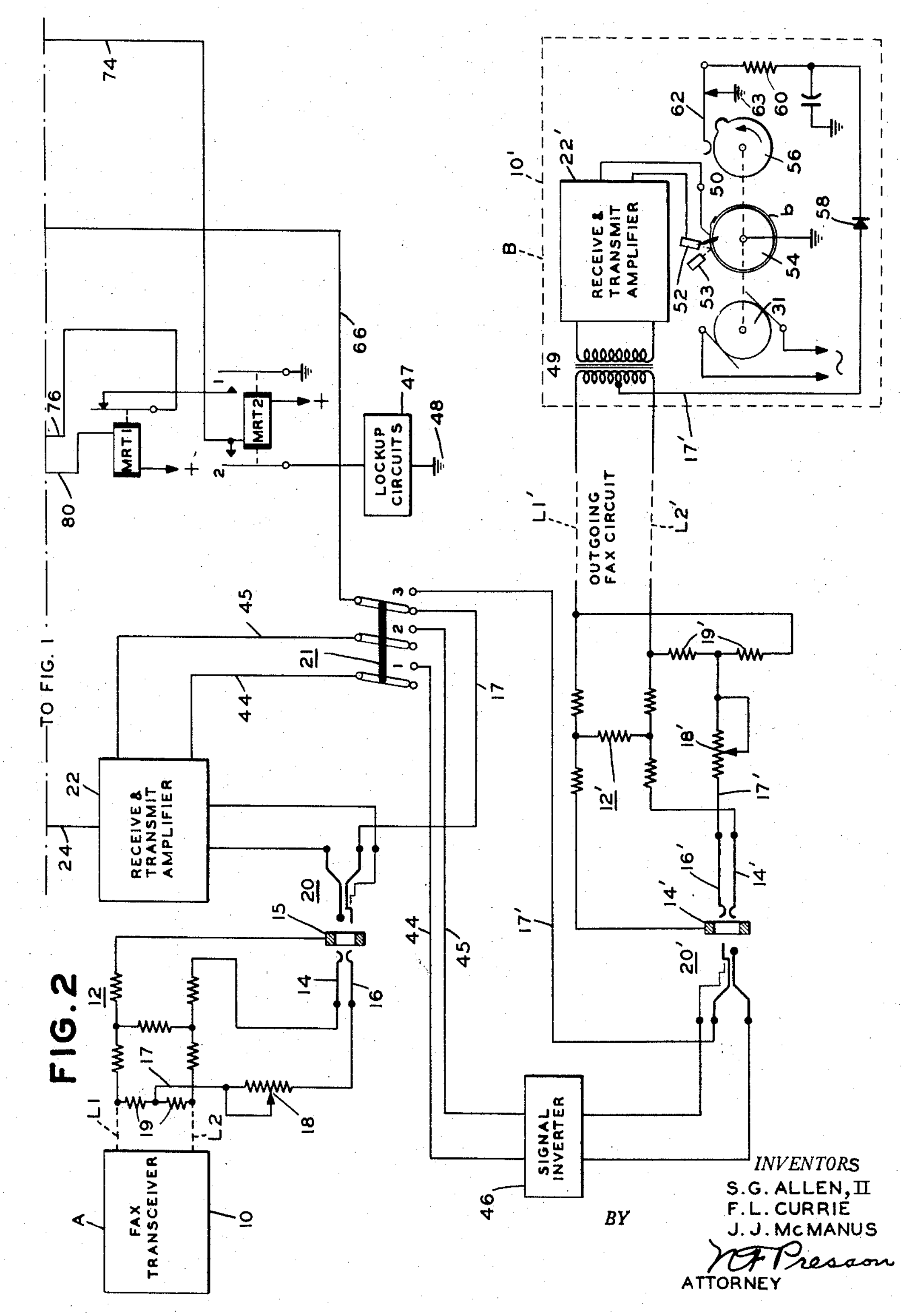

Fig. 1 shows a magnetic storage and retransmitting drum and its driving motor at a central office concentrator, and associated phasing relay circuits; and Fig. 2 shows a pair of facsimile transceivers each for transmitting messages to the magnetic drum for receiving messages retransmitted by the drum, together with certain of the phasing circuits employed.

Referring for the moment to Fig. 2 of the drawings, there is shown an outlying station A which may be a patron's office or a branch office and embodying a facsimile transceiver 10, and another outlying station B which may also be a patron's office or a branch office and embodying a facsimile transceiver 10' of the same type as the transceiver at station A. Various known types of facsimile transceivers may be employed, for example, and by way of illustration only, the type disclosed in U. S. patents to Wise et al. No. 2,718,547 and Ridings No, 2,742,526.

The transceiver 10 is connected by lines L1, L2 which include a conventional H-pad 12; from the H-pad line L1 is connected to the sleeve 15 of a switchboard jack in a manual concentrator system, and line L2 is connected to the tip spring 14 of the jack. Resistances 19 are bridged across the lines L1 and L2, and from a midpoint tap between these resistances is obtained a simplex circuit 17 having an adjustable current-limiting resistor 18 therein and connected to the ring spring 16 of the switchboard jack, the simplex circuit 17 having an adjustable current-limiting resistor 18 therein and connected to the ring spring 16 of the switchboard jack, the simplex circuit serving to conduct phasing pulses and other control pulses from station A to the receiving equipment at the concentrator. A switchboard plug 20 is adapted to be plugged into the switchboard jack whenever it is desired to receive from or transmit to station A. When the plug is inserted, the tip spring thereof engages the tip 14 of the switchboard jack and the sleeve of the plug engages the sleeve 15 of the jack. The tip and sleeve are connected to a receive and transmit amplifier 22. The ring spring of the jack forms a part of the simplex circuit 17 which is extended to a contact on a multi-pole switch 21, the switch being thrown to the left for receiving from station A, and being thrown to the right for retransmitting to station B.

The output of the amplifier 22 is connected by a conductor 24 to a magnetic transcriber device, such as a read and record magnet 26, Fig. 1, whereby an incoming facsimile message from station A may be recorded on a magnetic recording member such as a drum 28. Various kinds of magnetic storage drums are known in the art; in the instant embodiment a drum is employed which bears a covering storage surface composed of magnetic material, such as magnetic iron oxide, embedded in rubber. The magnetic transcriber head 26 is mounted on a scanning carriage similar to that commonly employed as the scanning carriage of a facsimile machine. During either a recording or a readout operation the carriage is caused to move slowly in any suitable manner, for example, by means of a half-nut which, when a carriage feed solenoid 36 is deenergized, is caused to engage a rotating lead screw to advance the carriage generally in the manner of certain well known facsimile scanning apparatus, for example, as disclosed in the U. S. patent to Ridings et al. No. 2,255,869. This causes the magnetic head to scan the rotating drum at a suitable rate for facsimile recording and retransmitting purposes.

The magnetic drum 28 is rotated by means of a synchronous motor 30 of the salient pole type. The speed at which the drum rotates will depend upon its diameter relative to the diameter of the facsimile drum at the transceiver stations. If the magnetic drum has a diameter such that its periphery is six times the periphery of a facsimile drum, an 1800 R. P. M. motor may be employed with suitable gear reduction to drive the magnetic drum at a speed of 30 R. P. M., corresponding to a speed of 180 R. P. M. of the facsimile drum. A source of 110 v. alternating current power for the motor 30 is supplied by conductors 32 and 33; conductor 33 is connected directly to one terminal of the motor, and a conductor 32' is connected through the armature 3 and break contact of a motor control relay MC, to the other side of the motor. The carriage feed solenoid 36 is in circuit with power conductor 33, contacts 4 of a relay MH, and power conductor 32, and is operative when deenergized to drop the head 26 onto the surface of the magnetic drum 28 and cause the half-nut to engage the associated lead screw to start the scanning carriage for effecting line feed whereby as the drum 28 rotates, the head 26 will scan a helical path on the surface of the drum.

On the left hand end of the drum is attached an interrupter comprising a brass disk 38 which contains six insulating segments 40, and as the drum is rotated by the motor, a brush 42 alternately engages the brass disk 38 and the segments 40 in order to generate local phasing (open) pulses, the disk being connected to ground by means of a brush 43. A magnetic drum pulsing relay MP is caused to pulse by means of the six insulating segments 40 for the purpose hereinafter explained; winding I of relay MP is the operating winding, and winding II of the relay is a "bucking" winding which when the relay is energized has sufficient ampere turns in opposition to winding I to aid in fast release action of the relay. The winding I causes a flux to flow through the core of the relay magnet for the operation of the relay. The closure of contacts 1 of the relay completes the circuit for the opposing winding II, and the current through these two windings is of such relative value that the magnetic flux generated in the relay core by winding I is sufficiently greater than that which winding II tends to generate in the opposite direction, to maintain the relay operated as long as the circuit through winding I is continued. When the circuit through winding I is opened the flux through the magnet is caused to reverse in direction by the action of winding II and overcomes any residual magnetism remaining, thus causing the flux through the core to pass through zero and thereby speed the release of the relay.

The phasing circuit embodying the instant invention will now be described in detail with reference to phasing between a facsimile signal storage member and a facsimile machine. It will therefore be assumed that an incoming message from station A has been recorded on the magnetic drum 28 at a central, or concentrator, office and that it is desired to retransmit this message to the facsimile transceiver 10' at station B. The transceiver at station B includes a synchronous drive motor 31 of the salient pole type that rotates the facsimile drum 54 and a phasing cam 56 at a speed of 180 R. P. M. Lines L1′ and L2′, over which the facsimile signals are retransmitted from the magnetic drum to the transceiver, are connected through a transformer 49 to the transmitting portion of a receive-and-transmit amplifier 22′. The amplifier has an output circuit connected to a recording stylus 50 which bears on a recording blank *b* when the machine is operated as a recorder. When operating as a transmitter, the subject matter copy is scanned by a photocell 52 which receives a scanning beam of light from a source 53 that is reflected from the transmitting blank onto the photocell in varying intensity depending upon the subject matter on the blank, and the output of the photocell 52 is connected to the amplifier 22′. The simplex phasing pulse circuit 17′ includes a rectifier 58 and a current-limiting resistance 60, and is connected to a spring 62 which normally rests on a round portion of the cam 56 to maintain a ground 48 on the simplex circuit except that for phasing purposes the ground is interrupted to provide a phasing (open) pulse when the lobe of the cam in its rotation engages and raises spring 62.

Referring to the phasing relays at the central concentrator station, relay MC hereinbefore referred to is the magnetic drum drive motor control relay and is the feedback control link between the magnetic drum and the relays which are pulsed by the outbound station B. Relay MC, at its armature 3 and associated break contact energizes and deenergizes the magnetic drum drive motor 30 for phasing purposes. Relay MP also referred to hereinbefore is the magnetic drum pulsing relay which during phasing is caused to pulse by the six insulated segments 40 in the disk 38. Relay P1 is a pulsing relay which develops its pulses from the contact interruption of the simplex ground 63 at office B, by the action of the synchronous motor driven cam 56. Relay P2 is a pulse stretching and coincidence aiding relay that effectively widens the phasing pulses derived from the pulsing circuit of the transceiver 10′, which pulses may have become distorted from line circuit characteristics. This relay aids the pulse coincidence by causing the motor control relay MC to delay in energizing the drum drive motor 30 just at the time when the phasing pulses from the magnetic drum and the transceiver are about to coincide. This delay causes the magnetic drum pulse to be retarded at the time when the transceiver pulse arrives, thus assuring pulse coincidence.

Relay CD is employed to detect the coincidence of the two pulses which indicate that the magnetic drum and transceiver are in phase. This relay has two windings; winding 1 is an operating winding and, as hereinafter described, is initially energized by ground supplied by the operation of a relay MRT2, and is held energized by grounds supplied by the armatures 2 and 3 of the pulsing relays MP and P1, respectively. The other winding II of relay CD is a "bucking" winding which, like winding II of relay MP, has sufficient ampere turns in opposition to the first winding I to aid in fast release action of the relay. Deenergization of this relay at its armature 4 and associated contact connects, over conductor 34, the magnetic drum drive motor 30 across the 60 cycle supply line 32, 33 to synchronize with the transceiver motor 31 connected to the same power system. Relay CD at its armature 5 and associated contact, energizes and deenergizes the carriage feed solenoid 36 which in turn raises or lowers the transcriber head 26; at the instant of drum phasing the relay CD is deenergized and likewise the solenoid, and the recording and readout head is lowered onto the drum.

Relay MH is a motor hold relay which at its armature 3 and associated contact, maintains a holding ground on relay MP until the onset of phasing pulses from the transceiver and by this action keeps relay MC deenergized and hence the drive motor 30 rotating at synchronous speed prior to phasing. The coincidence phasing process will thus start with the motor in a running state to obviate the possibility of erroneous phasing operations occurring when the motor is coming up to speed from standstill.

Relay TR is a test relay which is connected to a well known idle line test circuit in the concentrator; the relay is energized when the called line L1, L2, which is connected by inserting the associated switchboard plug 20′ in the switchboard jack associated with the called line, is available so as to prevent interfering with the desired circuit in the event that it should be busy. Relays MRT1 and MRT2, Fig. 2, are employed in the control circuits of relay CD.

*Operation of phasing circuit*

In the ready-to-transmit condition of the magnetic repeater circuit, the magnetic storage drum drive motor 30 is rotating the magnetic drum, and the transcriber head 36 is raised off the drum by means of the energized carriage-feed solenoid 36, since the relay MH is deenergized except during energization and detection of pulsing, the energizing path for the solenoid comprising armature 4 and break contact of the relay. The switch 21 is thrown to the right, as viewed in Fig. 2, for transmitting to office B. At contacts 1 and 2 of the switch the output circuit of the amplifier 22 is connected, over conductors 44 and 45, to a signal inverter 46, and thence through the switchboard plug 20′ and the jack connected to the line conductors L1′ and L2′, and at contact 3 of the switch the simplex phasing circuit 17′ is connected to a conductor 66 which leads to armatures 1 and 5 of the relays P1 and P2, respectively. Relay MP initially is held energized over a circuit comprising conductor 68 and armature 3 and associated contact of deenergized relay MH.

Assuming that the line to station B is found to be idle, the test relay TR is energized by the idle line test circuit in the concentrator; also the motor 31 at station B has been energized and is up to synchronous speed. Conventional lockup circuits 47, Fig. 2, apply a ground 48 to armature 2 of deenergized relay MRT2. The energized test relay TR at its armature 1 and make contact supplies battery to one side of the winding of relay P1, and P1 operates over a circuit comprising armature 5 and break contact of relay P2, and conductor 66 and the simplex circuit 17′ to the ground 63 supplied by the contact spring 62 of the transceiver 10′. Relay P1 locks up through its transfer armature 1 and inner make contact to the ground on conductor 66. The operation of P1 causes relay P2 to energize over a circuit comprising ground on the transfer armature 2 and make contact of P1, conductor 70, armature 2 and break contact of deenergized relay MC, and conductor 71 to the winding of P2. Relay P2 is held energized over two paths, one of which comprises its armature 3 and make contact, conductor 82 and armature 2 and make contact of P1; the other path for P2 comprises its armature 7 and make contact, conductor 81 and armature 2 and break contact of relay MH. It will be remembered that relay MP is held energized from a ground supplied by armature 3 and break contact of the motor holding relay MH, so that relay MC remains deenergized at this time.

The energized relay P2 at its armature 2 and make contact supplies ground over a conductor 74 to the winding of relay MRT2, Fig. 2. The latter relay operates and locks up to ground 48 through lockup circuits 47. At its armature 1 and make contact, relay MRT2 supplies a starting ground, through the armature and break contact of relay MRT1 and conductor 76, to the winding I of coincidence detecting relay CD, Fig. 1, which operates. Relay CD locks up over its armature 2 and make contact and conductor 78 to the two grounds from armatures 2 and 3 of the pulsing relays MP and P1, respectively. The carriage feed solenoid 36 is also held energized over armature 5 and make contact of the now energized relay CD, and thus the transcriber head is held off the drum under the control of this relay. The operation of DC, at its armature 4 and break contact, opened conductor 34 leading to one side of the power supply to the magnetic drum drive motor 30, and at armature 3 and make contact causes relay MRT1 to operate. The operation of the latter relay at its armature 1 and break contact opens the starting circuit of relay CD, and at armature 2 and make contact CD applies a locking ground over conductor 80 to the winding of relay MRT1.

The cam 56 at station B starts to interrupt the simplex circuit 17', and the simplex interruptions cause relays P1 and P2 to pulse. In response to the first phasing (open) pulse produced by the cam at the transceiver, relay P1 releases and in doing so it removes one of the holding paths for relay P2 through armature 2 of P1 and conductor 82. Relay P2, however, remains energized over the other holding path comprising its armature 7, conductor 81 and armature 2 of relay MH. When the release of relay P1 is completed, it establishes a circuit through its armature 3 and break contact, armature 6 and make contact of P2 and conductor 83 to energize relay MH. When MH energizes it removes at its armature 2 the remaining holding path for relay P2 which then releases. Also, when the relay MH energized it removed, at its armature 3 and make contact, the holding circuit 68 for the relay MP thereby enabling the latter relay to pulse at a rate determined by the speed of rotation of disk 38 relative to insulating segments 40. It will be noted that the first (open) pulse received from the transceiver is effective to cause the start of the local phasing pulses.

Relays P1 and P2 again energize when ground 63 is reapplied to the simplex circuit.

Let us assume that the pulse developed from the magnetic drum slotted disk 38 through relay MP is leading the second (open) pulse generated by the transceiver at station B through relays P1 and P2 by the largest possible phase error. When the brush 42 on the disk 38 contacts the first insulated slot 40, relay MP deenergizes and at its armature 2 and outer contact causes the motor control relay MC to energize. It will be noted that armature 1 and associated make contact of relay MC is a preliminary make contact arrangement, so that the armature engages its contact before its armatures 2 and 3 leave their associated break contacts, thereby to cause the relay to quickly establish a locking circuit for itself over its preliminary make contacts 1, conductor 72, and contacts 1 of relay P2 which is now energized. At its armature 3 relay MC opens one side 32' of the power supply to the magnetic drum motor.

The second interruption of the simplex circuit due to the opening of the break contacts 62 by the transceiver cam 56 deenergizes relay P1, and adds another locking ground to armature 1 of relay MC, over armature 2 and break contact of deenergized relay P1. Relay P2 releases a period after relay P1 releases, corresponding to the release time of P1 plus the release time of P2, thus removing at armature 1 of relay P2 one of the locking grounds for the relay MC. The latter relay continues to remain energized, keeping the magnetic drum drive motor deenergized, until the termination of the second transceiver break pulse when relay P1 reenergizes and removes the locking ground for MC over armature 2 and break contact of P1. The release of MC, together with the reoperation of P1, cause P2 to reenergize.

The motor 30 comes up to synchronous speed and in the process the MP relay releases in response to the next local pulse and energizes relay MC which locks up to the P1 and P2 relays, as before. This time, however, the motor-off period is less than the previous off time because the previous power interruption retarded the magnetic drum pulse to bring it more nearly in phase with the transceiver pulse. This feedback control process continues until the magnetic drum and transceiver pulses are very nearly co-incident. To insure absolute pulse coincidence the P1 relay acts on the termination of the break pulse from the transceiver to delay the deenergization of the motor control relay MC by the proper amount at the time when the pulses are about to coincide. When the local phasing (open) pulse from a segment 40 of the disk 38 terminates at or close to the beginning of the incoming phasing (open) pulse from the transceiver, the control relay MC is not fast enough to detect the slight disparity between true coincidence of the local and incoming pulses and thus would not bring the machines into exact phase with each other. To avoid this and insure proper phasing at such time, the leading edge of the open pulse from the transceiver cam causes relay P1 to release after a short interval corresponding to the release time of the relay, and at its armature 2 the relay applies a ground to the holding circuit 72 of relay MC, which ground is in addition to the previous holding ground applied by armature 1 of relay P2, so that MC is now held energized under the control of P1. Relay P2 releases following the release of P1, the release of P2 being timed by the release time of P1 and P2, so that P2 does not release until armature 2 of P1 has engaged its back contact. The effect of thus keeping MC energized at this time is to continue to cause motor 30 to slow down until the local and transceiver pulses coincide.

When the grounds from armature 2 and inner contact of relay MP, and armature 3 and inner contact of relay P1, which have been holding relay CD energized are removed simultaneously, the latter relay releases, fast release action being aided by the opposing ampere turns of the second winding II of the relay. Relay CD upon releasing, at its armature 4 and associated contact, closes the magnetic drum motor supply circuit removing the action of the motor control relay MC, and also at its armature 5 and associated contact causes the transcriber head 26 to be lowered onto the magnetic drum, and the half-nut to engage its lead screw, by deenergizing the carriage feed solenoid 36. The magnetic storage drum and the transceiver 10' now remain in phase, and the record stored on the magnetic drum is transmitted to the recorder at station B. At any suitable time after retransmission has been effected the record on the drum may be erased in known manner, whereupon the drum is ready to receive and store a subsequent message.

As hereinbefore mentioned, when the switch 21 is thrown to the left, as viewed in Fig. 2, the phasing circuit described will operate generally in the same manner for phasing from station A as it operates for phasing to station B, it being understood that the lockup circuits 47 are operative to apply the ground 48 to armature 2 of relay MRT2 when the inbound circuit from station A is connected through.

If desired, a cam having the proper number of lobes thereon may be employed for producing the local phasing pulses instead of the commutator and disk arrangement 38 to 42 illustrated, or any other suitable means may be employed to produce local phasing pulses of the proper width and spacing with respect to the drum 28. While the phasing circuit as described herein is employed to phase a facsimile storage drum with a facsimile transceiver, it will be appreciated that the phasing circuit is equally applicable to various other uses in which a synchronously driven device has to be brought into substantially exact phase with another synchronously driven device operating from the same power source as the first device or from a common synchronous source of power supply.

The specific system herein disclosed represents but one practical embodiment of our invention, and therefore the novel features expressed in the appended claims are not intended to be limited by the details here shown and described by way of explanation.

What is claimed is:

1. In a phasing system, a first rotatable device and a second rotatable device each driven by a synchronous motor, means for causing said driving motors each to run at synchronous speed, means at each of said devices for generating phasing pulses during rotation thereof, means including electrical circuit-controlling devices jointly controlled by the phasing pulses generated by both said rotatable devices for determining the amount of phase difference between said phasing pulses, and means controlled by said circuit-controlling devices for causing the driving motor of said first device to run at a synchronous speed for successive periods of different time intervals respectively proportional to the amount of phase difference then present between said devices and until said devices are in phase.

2. A system according to claim 1, including means to obviate the possibility of erroneous phasing operations occurring during the period that the driving motor for said first device is coming up to synchronous speed from standstill, said means comprising a relay circuit for causing said motor to reach synchronous speed prior to the time of control thereof by the phasing pulses from said devices.

3. In a phasing system, a first rotatable device and a second rotatable device each driven by a synchronous motor, means including energizing circuits for causing the driving motors to run at synchronous speed, means at each of said devices for generating phasing pulses during rotation thereof, and circuit means including relays jointly controlled by the phasing pulses generated by both devices for determining the amount of phase difference between said phasing pulses, and means controlled by said relays for disabling the energizing circuit for the driving motor of said first device for successive periods of different time intervals respectively proportional to the amount of phase difference then present between said devices and until the devices are in phase.

4. In a phasing system, a first rotatable device and a second rotatable device each driven by a synchronous motor, means including energizing circuits for causing the driving motors to run at synchronous speed, means at each of said devices for generating phasing pulses during rotation thereof, means including electrical circuit-controlling devices controlled by said phasing pulses for determining the amount of phase difference between said phasing pulses, means controlled by said circuit-controlling devices for disabling the energizing circuit for the motor of said first device for successive periods of different time intervals respectively proportional to the amount of phase difference then present between said phasing pulses, and circuit-controlling means controlled by the phasing pulses when they are near coincidence for causing an incoming phasing pulse from said second device to delay disabling said energizing circuit for the driving motor of said first rotatable device for a time interval sufficient to effect coincidence of the phasing pulses and phasing of the devices.

5. A phasing system according to claim 4, in which said circuit controlling means to delay disabling said energizing circuit for the driving motor of said first device is operative to effect a delay for a time interval substantially corresponding to that represented by the time interval of said incoming phasing pulse from said second device.

6. In a phasing system, a first rotatable device and a second rotatable device each driven by a synchronous motor, means including energizing circuits for causing the driving motors to run at synchronous speed, means at each of said devices for generating phasing pulses during rotation thereof, means including a motor control relay for opening and closing the energizing circuit for the driving motor of said first device, relay circuits jointly controlled by the phasing pulses generated by both devices for operating said motor control relay to open said energizing circuit for successive periods of different time intervals respectively proportional to the phase difference then present between said phasing pulses, and relay means effective when the phasing pulses are near coincidence for delaying the circuit-closing operation of said motor control relay for a time interval sufficient to effect coincidence of the phasing pulses and phasing of the devices.

7. In a phasing system, a first rotatable device and a second rotatable device each driven by a synchronous motor, means including energizing circuits for causing the driving motors to run at synchronous speed, means at each of said devices for generating phasing pulses during rotation thereof, means including a motor control relay operative to different positions respectively for opening and closing the energizing circuit for the driving motor of said first device, relay circuits jointly controlled by the phasing pulses generated by both devices for operating said motor control relay to open said energizing circuit for successive periods of different time intervals respectively proportional to the phase difference then present between said phasing pulses, said relay circuits including a group of relays effective when the phasing pulses are near coincidence for delaying the circuit-closing operation of said motor control relay for a predetermined time interval to effect coincidence of the phasing pulses and phasing of the devices, said group of relays including a relay which holds said motor control relay in a circuit-opening position for a time interval substantially corresponding to the release time of another relay of said group.

8. In a phasing system, a first rotatable device and a second rotatable device each driven by a synchronous motor, means including energizing circuits for causing the driving motors to run at synchronous speed, means at each of said devices for generating phasing pulses during rotation thereof, means including a motor control relay operative in its released position to close the energizing circuit for the driving motor of said first device and operative in its operated position to open said energizing circuit, means operative when a phase disparity exists between the phasing pulses from both devices for causing the phasing pulses from said first rotatable device to pulse the motor control relay to its operated position to open the energizing circuit for the motor, a first locking circuit for the motor control relay including break contacts on a first relay when the latter is in its released position, means including a phasing circuit from said second rotatable device for initially energizing said first relay, a second locking circuit for the motor control relay including make contacts on a second relay when the latter is in its operated position, said second relay being operated by the operation of said first relay, a locking circuit for said second relay including break contacts on a third relay when the latter is in its released position, said first relay being released by each incoming phasing pulse from said second rotatable device, said third relay being energized by said first relay when the latter reaches its released position, the energization of said third relay removing the holding circuit for said second relay which releases and removes said second locking circuit for the motor control relay and releases the latter relay to close the energizing circuit for said driving motor after a predetermined time interval following the termination of said phasing pulse applied to said first relay.

References Cited in the file of this patent

UNITED STATES PATENTS

| | | |
|---|---|---|
| 2,689,273 | Ridings | Sept. 14, 1954 |
| 2,779,820 | Weld | Jan. 29, 1957 |